United States Patent [19]
Matulek

[11] Patent Number: 6,164,132
[45] Date of Patent: *Dec. 26, 2000

[54] CAPACITIVE LIQUID LEVEL INDICATOR

[75] Inventor: Andrew M. Matulek, Fenton, Mo.

[73] Assignee: G.D.M, Inc., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 09/145,675

[22] Filed: Sep. 2, 1998

Related U.S. Application Data

[63] Continuation-in-part of application No. 08/873,766, Jun. 12, 1997, abandoned.

[51] Int. Cl.[7] .................................................. G01F 27/26
[52] U.S. Cl. ............................................................ 73/304 C
[58] Field of Search ........................................... 73/304 C

[56] References Cited

U.S. PATENT DOCUMENTS

| | | | |
|---|---|---|---|
| 3,343,415 | 9/1967 | Johnston | 73/304 C |
| 3,715,638 | 2/1973 | Polye | 317/247 |
| 3,952,593 | 4/1976 | Ells | 73/304 C |
| 4,510,436 | 4/1985 | Raymond | 324/61 P |
| 4,553,434 | 11/1985 | Spaargaren | 73/304 C |
| 4,564,881 | 1/1986 | Kant et al. | 361/284 |
| 4,594,893 | 6/1986 | Lombard et al. | 73/304 C |
| 4,603,581 | 8/1986 | Yamanoue et al. | 73/304 C |
| 4,624,139 | 11/1986 | Collins | 73/304 C |
| 5,051,921 | 9/1991 | Paglione | 364/509 |
| 5,103,368 | 4/1992 | Hart | 361/284 |
| 5,142,909 | 9/1992 | Baughman | 73/304 C |
| 5,144,835 | 9/1992 | McDonald | 73/304 C |
| 5,175,505 | 12/1992 | Magenau et al. | 324/671 |
| 5,399,979 | 3/1995 | Henderson et al. | 324/677 |
| 5,406,843 | 4/1995 | Hannan et al. | 73/304 C |
| 5,551,288 | 9/1996 | Geraldi et al. | 73/170.26 |

*Primary Examiner*—Hezron Williams
*Assistant Examiner*—Willie Morris Worth
*Attorney, Agent, or Firm*—Peter D. Keefe

[57] ABSTRACT

A capacitive liquid level indicator having a capacitive sensor array superposed on each side of a dielectric substrate, wherein the sensor signal detection electronics are located immediately adjacent each capacitive sensor. These provisions result in high sensitivity of detection of submergence in the liquid, as well as essentially eliminating parasitic electric fields. The preferred capacitive sensors are interdigitated capacitors, and the preferred sensor signal detection circuit is an RC bridge and a comparator, wherein the comparator senses a voltage difference in the RC bridge between a sensor resistor and sensor capacitor of a first leg thereof and a reference resistor and reference capacitor of a second leg thereof. It is preferred for the capacitive liquid level indicator to be coated with a low dielectric conformal coating to thereby insulate the electronic components (inclusive of the capacitive sensors) thereof with respect to the liquid into which it is submerged. The sensitivity of the capacitive liquid level sensor according to the present invention is extremely high; as a result, a reference capacitive sensor is obviated, and there are no false indications of liquid due to any film of the liquid clinging to an exposed portion of the capacitive liquid level sensor.

14 Claims, 6 Drawing Sheets

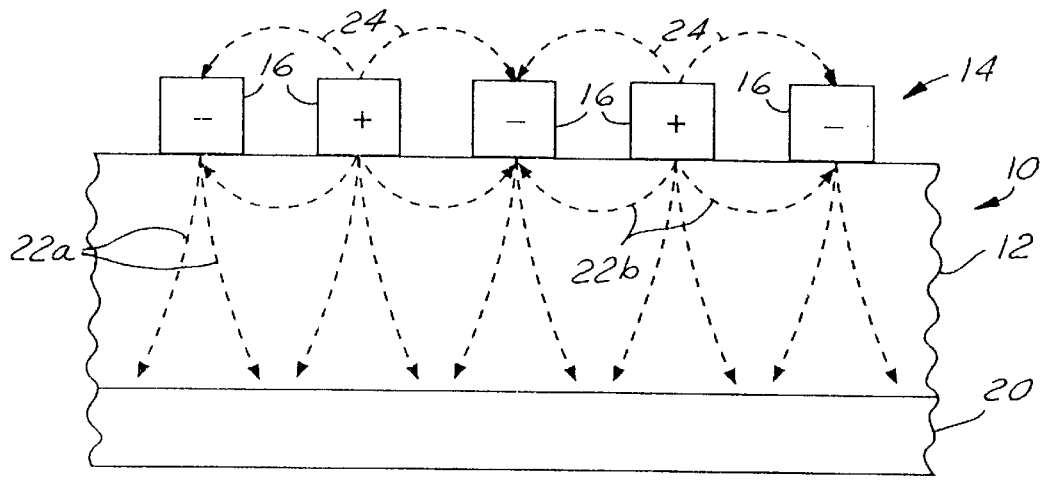
(PRIOR ART)
FIG. 1
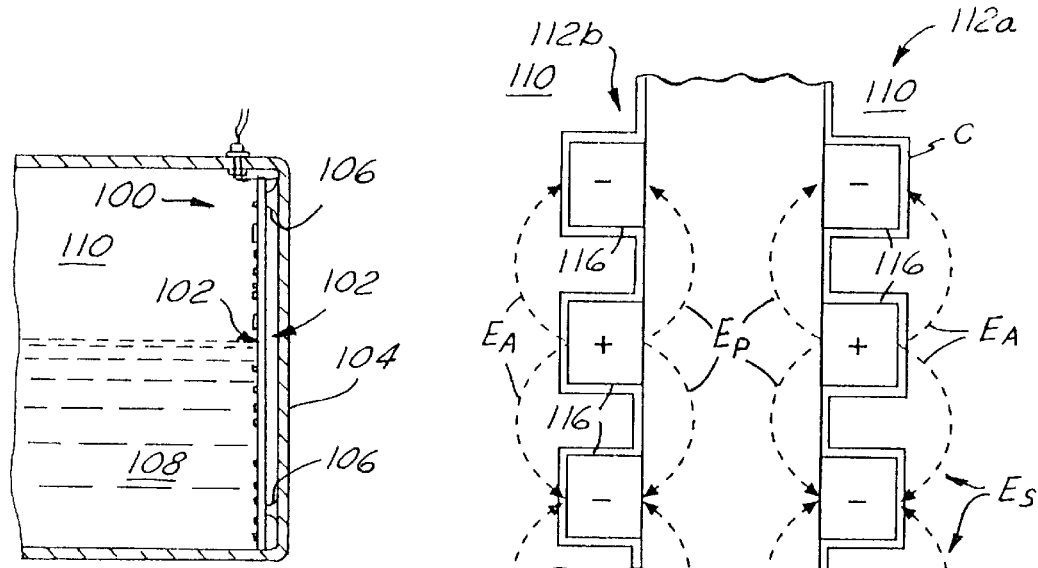
FIG. 2
FIG. 3

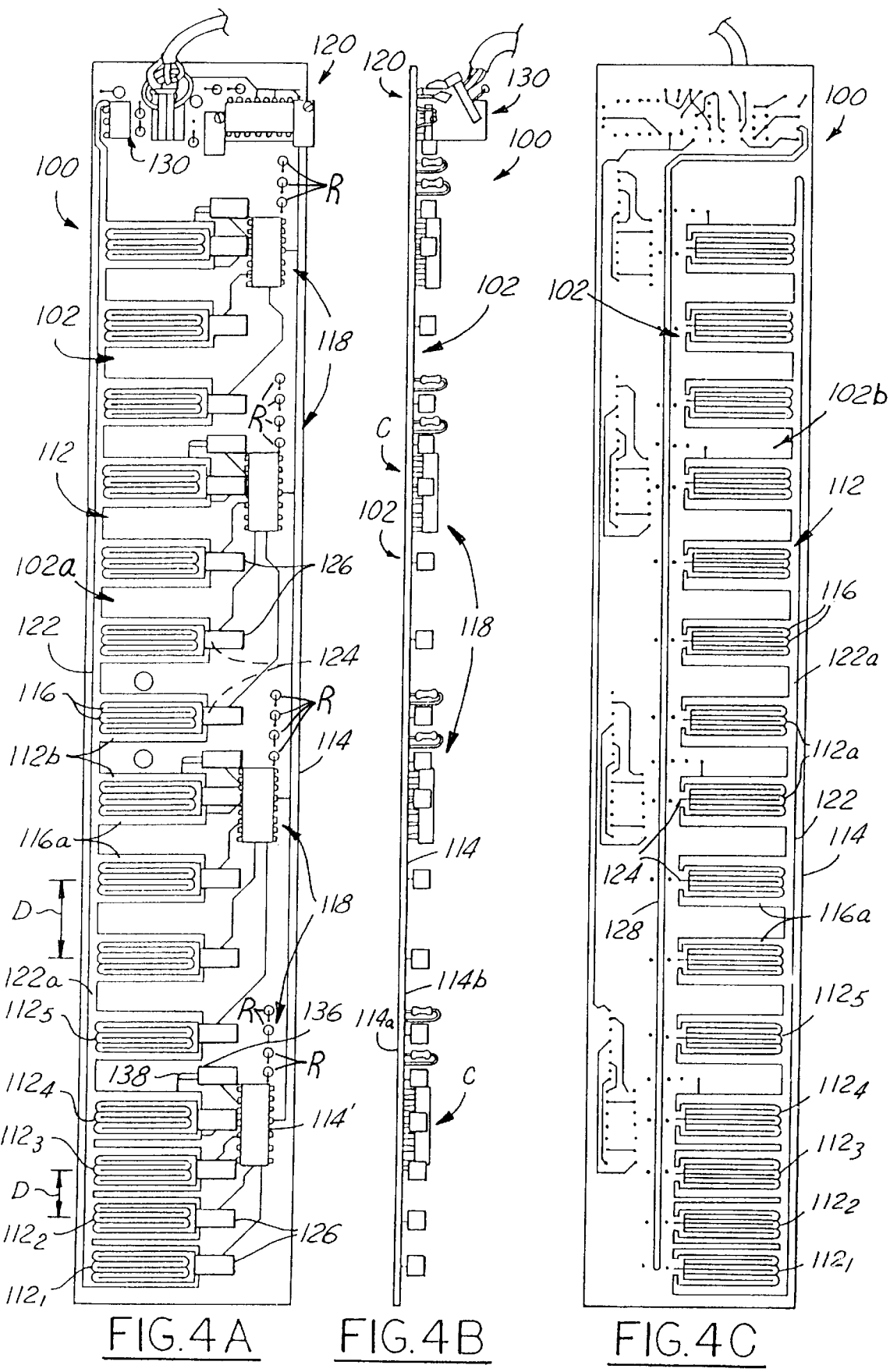

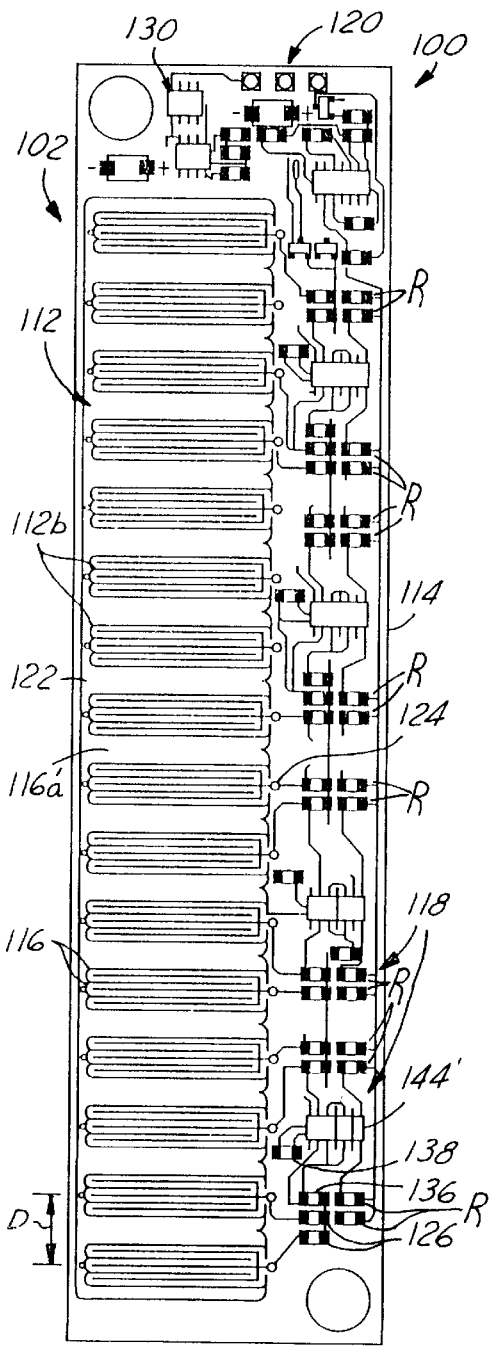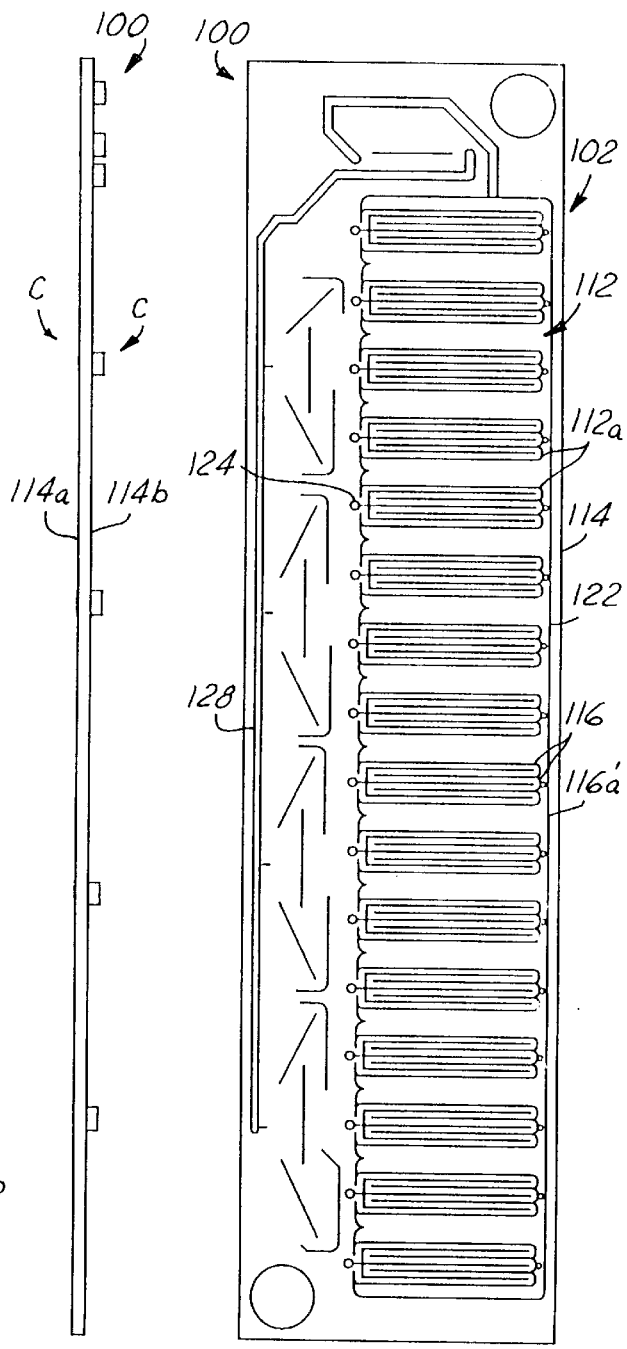
FIG.5A  FIG.5C  FIG.5B

CAPACITIVE LIQUID LEVEL INDICATOR

CROSS-REFERENCE TO RELATED APPLICATIONS

The present application is a continuation-in-part application of application Ser. No. 08/873,766, filed on Jun. 12, 1997, which is presently now abandoned.

BACKGROUND OF THE INVENTION

1. Field of the Invention

The present invention relates to liquid level indicators operating electronically using a capacitive sensor array. More particularly, the present invention relates to a capacitive liquid level indicator having capacitive sensors and associated circuitry for providing very high sensitivity to detecting the amount thereof submerged in a liquid.

2. Description of the Prior Art

Knowledge of the level of a liquid in a container provides valuable information for a number of reasons. Not only does this information provide fullness of a tank and volume of liquid data (based upon the dimensions of the tank), but this information also provides operational data regarding ancillary devices which are dependent upon the presence of liquid in the tank. An example of such a situation is a vehicle fuel tank.

Devices to measure liquid levels generally fall into two types of liquid level indicators. A first (and older) type of liquid level indicator relies upon fluid mechanics, whereby a pivotable arm has a distally connected float which buoyantly interacts with a surface portion of the liquid, the angle of the pivot arm providing an indication of the liquid level. A second (and newer) type of liquid level indicator relies upon electrical properties of the liquid with respect to which sensors submerged in the liquid generate signals to an electronic circuit, which, in turn, provides indication of the level of the liquid. In view of the potential for increased accuracy of electronic liquid level indication (as opposed to mechanical liquid level indication), the art has struggled with providing reliable and accurate electronic liquid level indicators.

With regard to electronic liquid level indicators, the electrical property of choice for sensing liquid level is the dielectric property of the liquid as compared to that of air above the liquid. In order to sense the dielectric property of the liquid, capacitive sensors are used, wherein the electrical field between the plates is affected by the presence of the liquid, the dielectric constant of which being greater than air.

Examples of capacitive liquid level indicating devices are U.S. Pat. Nos. 5,406,843; 5,144,835; 5,142,909; 5,103,368; 5,051,921; 4,624,139; 4,603,581; 4,594893; 4,564,881; and 4,553,434. Generally speaking, capacitive based liquid level indicating devices are composed of an array of capacitive sensors, or a capacitive sensor in the form of a single set of plates (fingers), arranged vertically in the liquid, as well as an electronic circuit for processing signals from the capacitive sensor(s) responsive to changes in capacitance thereof due to changes in the area thereof in contact with the liquid, and for actuating a level indicator, such as a fuel gauge.

What remains a problem in the art of capacitive liquid level indicators are spurious capacitive values introduced by the capacitance of the leads between the capacitive sensors and the electronic circuit which lead capacitance mixes with the sensor capacitance, thereby adversely affecting the ability of the electronic circuit to accurately indicate the liquid level under all conditions.

What remains yet another problem in the art of capacitive liquid level indicators are parasitic electric fields associated with the dielectric substrate to which the capacitive sensors are affixed. The term "parasitic electric fields" herein means any electric field inside the substrate, in contradistinction to electric fields outside the substrate which are referred to herein as "sensing electric fields". In this regard, there are two kinds of parasitic electric fields: that which passes through the substrate between the plates (ie., fingers) of a capacitive sensor, referred to herein as a "cross-plate parasitic electric field" and that which passes generally through the substrate, referred to herein as "trans-substrate parasitic electric fields". Parasitic electric fields can adversely affect the sensitivity of a capacitive sensor to detecting submersion in liquid if the parasitic electric fields are relatively large in relation to the sensor electric field.

Parasitic electric fields have been addressed in the art with only limited success, such as for example by the presence of a ground plate as shown at FIG. 1. In this regard, a capacitive liquid film indicator 10 has a dielectric substrate 12 which supports on one side an interdigitated capacitive sensor 14. Successive plates in the form of fingers 16 of the capacitive sensor 14 have opposite polarity (fingers having a positive polarity are designated by a "+"and fingers having a negative polarity are designated by a "−"), wherein the number of fingers is optional On an opposite side of the substrate 12 is a ground plate 20 which is tied to ground. However, as depicted at FIG. 1, the ground plate 20 is believed to interact with the capacitive sensor 14, whereby a trans-substrate parasitic field 22a is present through the substrate 12, in addition to the cross-fingers parasitic electric field 22b. The sensing electric field 24 of the capacitive sensor 14, which is external to the substrate 12 is believed to be not so much larger than the parasitic electric fields 22a, 22b that the influence of the parasitic electric fields, particularly the trans-substrate parasitic electric field, can be ignored. Indeed, under certain operational conditions, it is believed that an erroneous liquid level indication may possibly be generated. For a discussion of the issues surrounding this capacitive sensor technology, see U.S. Pat. No. 5,175,505.

What yet further remains another problem in the art of capacitive liquid level indicators is lack of ability to inherently accommodate a range of liquid types without resort to a reference capacitive sensor. This problem is related to the limited sensitivity range of the capacitive sensors when arranged as an array on a dielectric substrate. In this regard, the prior art typically teaches a reference capacitive sensor located in the liquid for biasing the capacitive sensor array to the dielectric constant of the liquid. Problematical with this concept is if the reference capacitive sensor should become exposed to air due to low liquid levels in the tank, the capacitive array will bias to the dielectric constant of air, and then generate a signal indicating a full tank when the tank is, in fact, empty.

Accordingly, what is needed in the art is a capacitive liquid level indicator which has sufficiently low lead capacitance that lead capacitance can be ignored, has sufficiently low parasitic electric fields that these fields can be ignored, and has a sufficiently wide sensitivity range so as to accommodate a wide range of liquid types without need of a reference capacitive sensor.

SUMMARY OF THE INVENTION

The present invention is a capacitive liquid level indicator which has sufficiently low lead capacitance that lead capacitance can be ignored, has sufficiently low parasitic electric fields that these fields can be ignored, and has a sufficiently wide sensitivity range so as to accommodate a wide range of liquid types without need of a reference capacitive sensor. The liquid level indicator according to the present invention includes a dual capacitive sensor array having complimentary half portions thereof superposed on each side of a dielectric substrate, wherein the sensor signal detection circuit is located immediately adjacent each capacitive sensor. These provisions result in high sensitivity of detection of submergence in the liquid, as well as essentially eliminating parasitic electric field effects.

The capacitive liquid level indicator according to the present invention is generally composed of: a dielectric substrate; a dual capacitive sensor array composed of a first capacitive sensor array located in a first predetermined spaced relation on one side of the substrate and a second capacitive sensor array located on the opposite side of the substrate in superposed relation to the first capacitive sensor array; a plurality of sensor signal detection circuits located on the substrate in a second predetermined spaced relation generally corresponding to the predetermined spaced relation; and signal conditioning electronics for providing a signal to a level indicator in response to signal outputs from the sensor signal detection circuits.

According to the preferred form of the capacitive liquid level indicator, the capacitive sensors are interdigitated capacitors, wherein each successive finger (plate) thereof has an opposite polarity. Further, the polarity of the fingers of the first capacitive sensor array is like that of the second capacitive sensor array, thereby essentially eliminating parasitic electric fields therebetween through the substrate (ie., eliminating trans-substrate parasitic electric fields).

Further according to the preferred form of the capacitive liquid level indicator, each successive capacitive sensor of the first and second capacitive sensor arrays is paired in parallel and collectively wired to a respective sensor signal detection circuit immediately adjacent thereto. A preferred sensor signal detection circuit includes an RC bridge and a comparator, wherein the comparator senses a voltage difference in the RC bridge between a a sensor resistor and a capacitive sensor pair of a first leg thereof and a reference resistor and reference capacitor of a second leg thereof.

It is preferred for the capacitive liquid level indicator to be coated with a low dielectric conformal coating to thereby insulate the electronic components thereof with respect to the liquid into which it is submerged. The sensitivity of the capacitive liquid level indicator according to the present invention is extremely high; as a result, a reference capacitive sensor is obviated, and there are no false indications of liquid due to any film of the liquid clinging to an exposed portion of the capacitive liquid level sensor.

Accordingly, it is an object of the present invention to provide a capacitive liquid level indicator having very high sensitivity to the presence of a liquid and very low sensitivity to parasitic electrical fields, particularly trans-substrate parasitic electric fields.

It is a further object of the present invention to provide a capacitive liquid level indicator having dual sets of capacitive sensor arrays.

It is another object of the present invention to provide a capacitive liquid level indicator wherein each capacitive sensor has its signal detection circuit located immediately adjacent thereto, whereby capacitance of leads between the signal detection circuit and the capacitive sensor is small enough to be ignored.

It is an additional object of the present invention to provide a capacitive liquid level indicator wherein sensitivity is sufficiently high that a reference capacitive sensor is obviated.

It is still another object of the present invention to provide a capacitive liquid level indicator having signal detection circuits located immediately adjacent respective capacitive sensors, wherein the capacitive liquid level indicator is coated with a low dielectric conformal coating.

It is yet a further object of the present invention to provide a capacitive liquid level indicator which is sufficiently sensitive to distinguish between being submerged in a wide range of liquids and being coated by a film of the liquid These, and additional objects, advantages, features and benefits of the present invention will become apparent from the following specification.

BRIEF DESCRIPTION OF THE DRAWNGS

FIG. 1 is a schematic side view of a prior art capacitive sensor for sensing fuel wall film showing the sensing electric field and the believed present relatively significant trans-substrate parasitic electric field.

FIG. 2 is a partly sectional side view of a tank holding a liquid, wherein the level of the liquid is being sensed by a capacitive liquid level indicator according to the present invention.

FIG. 3 is a schematic side view of a capacitive sensor of the capacitive liquid level indicator according to the present invention, showing the sensing electric field and relatively insignificant parasitic electric fields.

FIGS. 4A through 4C are elevational views of the capacitive liquid level indicator according to a first example of the present invention.

FIGS. 5A through 5C are elevational views of the capacitive liquid level indicator according to a second example of the present invention.

DETAIlED DESCRIPTION OF THE PREFERRED EMBODIMENT

Figure 6:
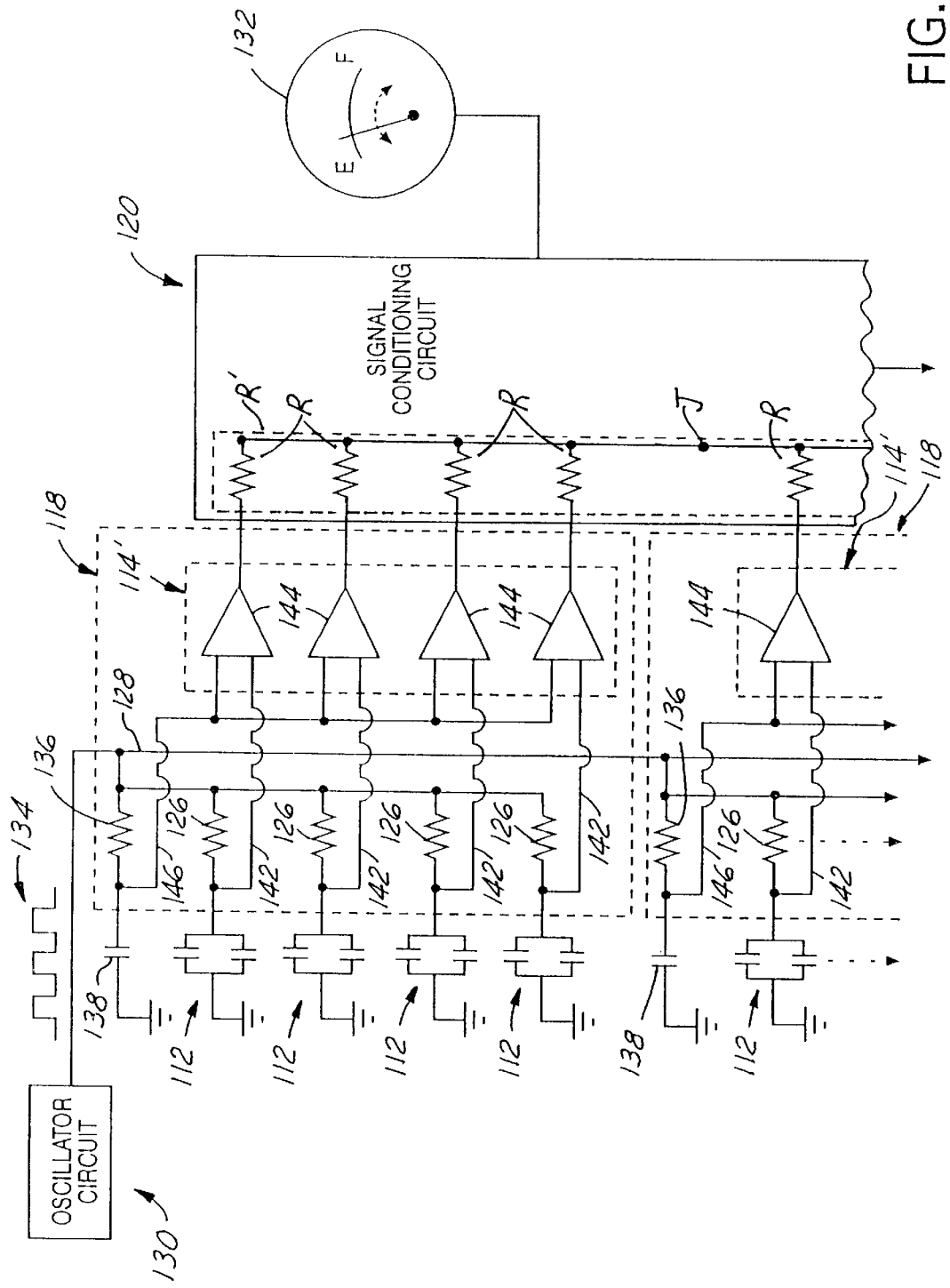
FIG. 6 is a schematic diagram of a preferred electrical circuit of the capacitive liquid level indicator according to the present invention.

Referring now to the Drawing, FIGS. 2 through 1OA depict preferred embodiments of the capacitive liquid level indicator 100 according to the present invention.

FIG. 2 depicts the capacitive liquid level indicator 100 in a typical environment of operation, wherein a dual capacitive sensor array 102 (see FIGS. 4A, 4C, 5A, and 5C) is oriented vertically in a tank 104. The capacitive liquid level indicator can be internally connected to the tank 104 by any known fastener means, such as by stand-offs 106, or in the case of automotive gasoline tanks, to the fuel pump bracket assembly or the fuel delivery module. In any event, bellowing of the tank 104 due to temperature or pressure changes are to be accounted for when mounting the capacitive liquid level indicator so that the capacitive liquid level indicator is bottom referenced, yet is not damaged or strained by tank wall movement. A liquid 108, such as for example gasoline, is contained in the tank 104. Above the liquid 108 is air (or another gas) 110. The capacitive liquid level indicator 100 senses the portion thereof which is submerged in the liquid 108 and the portion thereof which is outside of (or emerged from) the liquid and in the air 110, whereupon a signal is generated which, via an indicator, informs a user of the liquid level in the tank 104.

The capacitance principle under which the capacitive liquid level indicator 100 operates is depicted at FIG. 3. A capacitive sensor pair 112 of the dual capacitive sensor array 102 is affixed externally to a dielectric substrate 114 so as to be exposable to the liquid 108 or the air (or gas) 110 thereabove. An oscillating voltage is applied to the capacitive sensor pair 112 which voltage causes an electric field to be generated between adjacent and oppositely polarized fingers (plates) 116 thereof (the configuration of the capacitive sensor may be other than interdigitated fingers, as shown, although an interdigitated fingers configuration is preferred). The dielectric constant of the liquid 108 is greater than the dielectric constant of air (or gas) 110, whereupon the sensing electric field, Es has two aspects: the sensing electric field $E_A$ in air and the sensing electric field $E_L$ in the liquid (the former being larger than the latter). Accordingly, the capacitance is higher in the liquid than it is in the air. An electrical circuit (discussed hereinbelow) distinguishes the difference in capacitance of the capacitive sensor due to the change in dielectric constant of a changed medium in contact with the capacitive sensor, and thereupon responsively actuates a gauge or other indicating device. Parasitic electric fields $E_F$ are very small inside the substrate because the superposed fingers 116 have like polarity. Indeed, the magnitude of trans-substrate parasitic electric fields is believed to be so small that these may be considered essentially non-existent when compared to the sensing electric field $E_S$ (which is why trans-substrate parasitic electric fields are not depicted in FIG. 3).

Because a pair of capacitive sensors 112a, 112b is provided and the effects of trans-substrate parasitic electric fields and lead capacitance are so small as to be ignorable, the sensitivity range of each capacitive sensor pair 112 is sufficiently high for the electrical circuit to distinguish a range of liquid types vis-a-vis air (gas) above the liquid, as well as films of the liquid vis-a-vis immersion in the liquid, wherein films of the liquid may coat the capacitive sensors, as for example may happen due to surface tension after the liquid has sloshed or splashed onto the capacitive sensors.

FIGS. 4A, 4B and 4C depict a first preferred example of the capacitive liquid level indicator 100.

The dielectric substrate 114 is typically of an elongated rectangular shape whereby it extends from the bottom to the top of a tank; however, depending on the shape of the tank, other substrate shapes may be preferred. The substrate 114 serves to mechanically support the dual capacitive sensor array 102 in a known fixed relationship with respect to elevation in a tank to which the capacitive liquid level indicator 100 is to be placed. The preferred materials for the substrate 114 include conventional circuit board materials, ceramics, fiberglass, KAPTON (a registered trademark product), or other plastics, among other similarly suitable materials.

The dual capacitive sensor array 102 is composed of a plurality of capacitive sensor pairs 112 arranged in spaced relation on opposing sides of the dielectric substrate 14, wherein a first capacitive sensor array 102a is located on a first side 114a of the substrate and a second capacitive sensor array 102b is located on a second side 114b of the substrate. Each of the first and second capacitive sensor arrays 102a, 102b are essentially identical, wherein the respective capacitive sensors 112a, 112b of each capacitive pair 112 thereof are superposed with respect to each other.

The dual capacitive sensor array 102 (see FIG. 3) may be formed by etching in the manner printed circuits are made, or may be formed and affixed to the two opposing sides of the substrate in any known manner, such as for example screening, plating or deposition processes.

Along the dual capacitive sensor array 102, successive capacitive sensor pairs 112 form first ($112_1$), second ($112_2$), third ($112_3$), fourth ($112_4$), fifth ($112_5$), and so on, capacitive sensor pairs 112, wherein the first and second capacitive sensors 112a, 112b of each capacitive sensor pair are connected in parallel Immediately adjacent each capacitive sensor pair 12 is a respective sensor signal detection circuit 118. In this regard, each capacitive sensor pair 112 may uniquely have its own respective reference capacitor and reference resistor, or a predetermined number (such as four) of capacitive sensor pairs may share a common reference capacitor and reference resistor (which is further discussed hereinbelow). The sensor signal detection circuits 118 are affixed to the substrate 114 immediately adjacent their respective capacitive sensor pairs 112, wherein it is expected that the sensor signal detection circuits will be submerged, along with the capacitive sensor pairs, in the liquid to be sensed.

The output from the sensor signal detection circuits 118 is sent to a conditioning circuit 120. The conditioning circuit 120 provides, optionally with the aid of further circuitry upstream thereof, a signal to a level indicator (ie., gauge) which indicates the level of a liquid in a tank.

Figure 9:
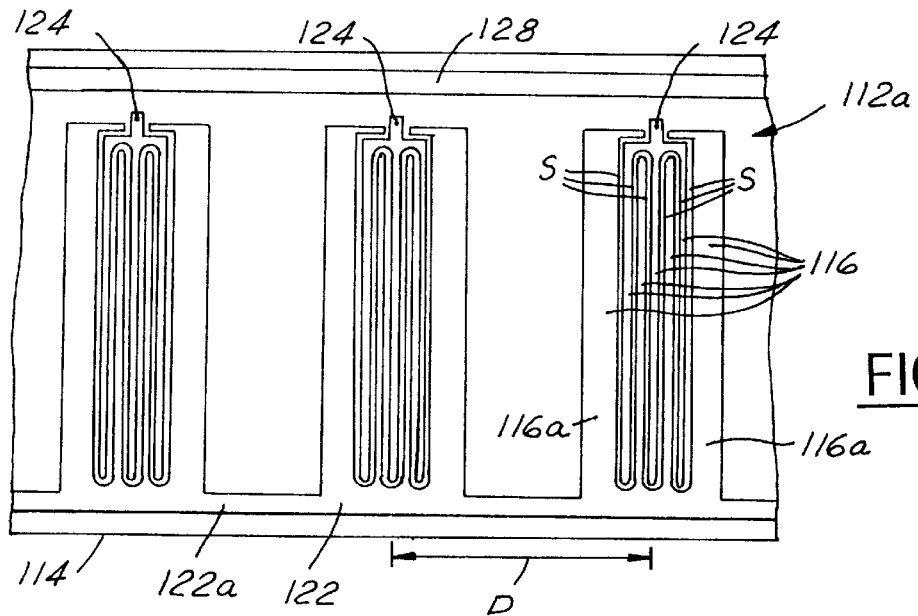
FIG. 9 is a top plan view of a plurality of preferred interdigitated capacitive sensors of the capacitive liquid level indicator according to the present invention.

FIG. 9 shows a preferred configuration of each capacitive sensor 112a (each capacitive sensor 112b at the other side of the substrate 114 is identical thereto). The preferred capacitive sensor 112a, 112b is interdigitated, having fingers 116 spaced apart a separation spacing S, and which are connected, successively, to alternately first and second electrodes 122, 124. The first electrode 122 is in the form of a ground buss 122a which is connected to ground. The second electrode 124 is connected through a respective sensing resistor 126 to an oscillator buss 128 which is connected to a conventional oscillator circuit 130. The polarity of the first and second electrodes 122, 124 are opposite and the voltage applied is provided by the oscillator circuit 130. The finger 116a at either side of each capacitive sensor 112a, 112b is broadened and serves to confine the sensing electric field of the capacitive sensor to between the fingers 116 thereof.

Each capacitive sensor 112a, 112b is separated center to center from each successive capacitive sensor by a separation, which, as shown at FIGS. 4A and 4C is progressively varied. For example, the separation distance D between centers of the capacitive sensors 112a, 112b may be small near one end of the capacitive liquid level indicator and larger at the other end to thereby give finer graduation of sensing of liquid level as the liquid nears the bottom of the tank.

The capacitive id level indicator 100 is preferably coated with a conformal coating C (see FIG. 3) to thereby seal and electrically insulate the components thereof from the fluids encountered during operation. While it is possible to use any known conformal coating, including epoxy and urethane, the preferred conformal coating is a low dielectric conformal coating, such as paralene or polyimide, most preferably polyamideinide. The conformal coating may be applied by any known methodology, such as for example by spraying or by dipping.

FIGS. 5A through 5B depict a second example of the capacitive liquid level indicator 100. In this regard, like numbered components are as described hereinabove, and no further discussion thereof is necessary. However, in this example, the pairs of capacitive sensors 112 have a uniform spacing D from center to center thereof, and the fingers 116$a'$ of adjacent capacitive sensors is shared.

Referring now to FIGS. 6, 7, 7A, 8, 10 and 10A the preferred electronic embodiment of the capacitive liquid level indicator 100 will be detailed.

FIG. 6 depicts an electrical schematic for the capacitive liquid level indicator 100, as well as a conventional analog level indicator gauge 132.

A conventional oscillator circuit 130, preferably driven by a well known and common 555 oscillator chip, provides an oscillating voltage output 134, which may be square wave, saw tooth or another selected waveform. As shown at FIG. 10A, the preferred wave form of the oscillating voltage output 134' is square wave having a duty cycle greater than 50 percent, wherein the time on is between $T_1$ and $T_2$ and the time off is between $T_2$ and $T_3$ wherein the on time is longer than the off time based upon the charging constant of the capacitive sensor pair 112, which will be further discussed hereinbelow. Alternatively, the comparator output would be reversed (and also usable for liquid level sensing) if the duty cycle is less than 50 percent.

The oscillating voltage output 134 is connected to the oscillator buss 128. The oscillator buss 128 is connected to a plurality of sensor resistors 126 and a reference resistor 136. Each capacitive sensor pair 112 is connected to a respective sensor resistor 126, and a reference capacitor 138 is connected to the reference resistor 136.

FIG. 6 indicates a preferred sensor signal detection circuit 118, wherein each capacitive sensor pair 112 has its own sensor resistor 126, its own comparator 144, but each four capacitive sensor pairs share a common reference resistor 136 and reference capacitor 138, wherein the four respective comparators therefor are provided by a single LMC660AIN quad comparator chip 14' (also referred to as a quad op amp). Modifications are possible from this circuit. For example, each capacitive sensor pair may have its own reference resistor and reference capacitor (ie., its own respective RC bridge). Further for example, a reference resistor and reference capacitor may be provided for a predetermined number of capacitive sensor pairs, as for example the aforesaid four capacitive sensor pairs (which circuit for the sake of simplicity of manufacture is most preferred), or as for example all the capacitive sensor pairs. The spacings of the electrical components is determined by affixment practicalities on the substrate 114, so that the sensor signal detection circuit 118 is to be considered located substantially immediately adjacent its respective capacitive sensor pair so long as the spacing is in the general vicinity thereto.

Figure 7:
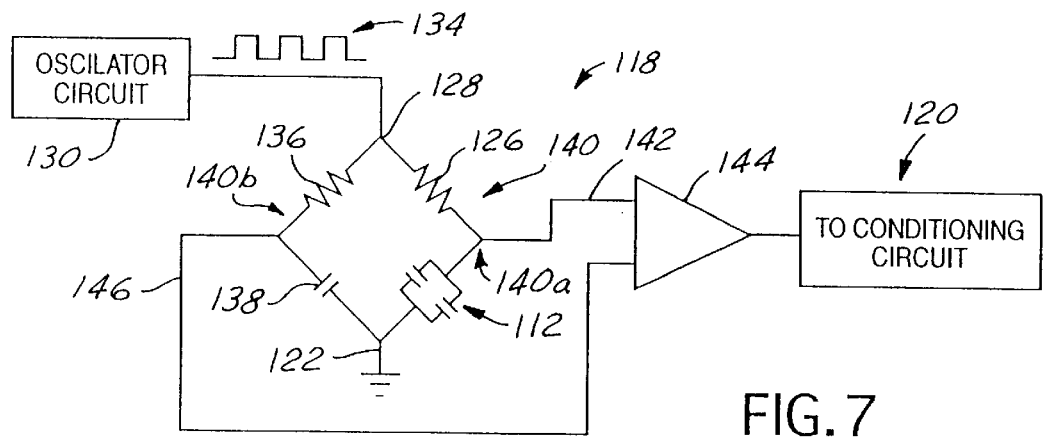
FIG. 7 is a detail schematic diagram of a preferred capacitive sensor and associated sensor signal detection circuit therefor of the capacitive liquid level indicator according to the present invention.
Figure 7A:
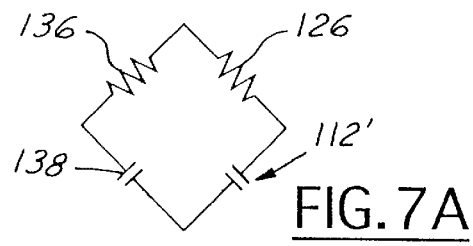
FIG. 7A is a detail schematic diagram showing the RC bridge having only a single capacitor capacitive sensor.

As shown at FIG. 7, each sensor capacitor pair 112 and its respective sensor resistor 136 form a first leg 140$a$ of an RC bridge 140, while the reference resistor 136 and reference capacitor 138 form a second leg 140$b$ thereof. A first connection 142 of the first leg 140$a$ located between the sensor resistor 126 and sensor capacitor pair 112 goes to one side of a comparator 144. A second connection 146 of the second leg 140$b$ located between the reference resistor 136 and the reference capacitor 138 goes to the other side of the comparator 144. As shown at FIG. 7A, a capacitive sensor 112' may not be a pair, but may rather be a single capacitor located on a single side of the substrate 114.

For instructive purposes, and not by way of limitation, examples of component values are: a capacitive sensor pair has a capacitance of 8 pico-Farads; a sensor resistor has a value of 4.5 kilo-Ohms, a reference capacitor has a capacitance of 8 pico-Farads; a reference resistor has a resistance of 4.5 kilo-Ohms; and the oscillator circuit provides a modified square wave having more than a 50 percent duty cycle at a frequency of 3 mega-Hertz. The reference capacitors 138 are fixed ceramic chip capacitors, the capacitance value of which is unaffected by submergence.

In operation of the sensor signal detection circuits 18, the oscillator frequency is faster than the gain band width product of the comparator 144. Accordingly, if the voltage of the first connection 142 is less than that of the second connection 146, then the comparator is switched on, but if the voltage of the first connection is greater than that of the second connection, then the comparator is switched off. The relative values of the voltage at the first and second connections depends upon the medium dependent capacitance of the capacitive sensor pair 112.

Figure 10:
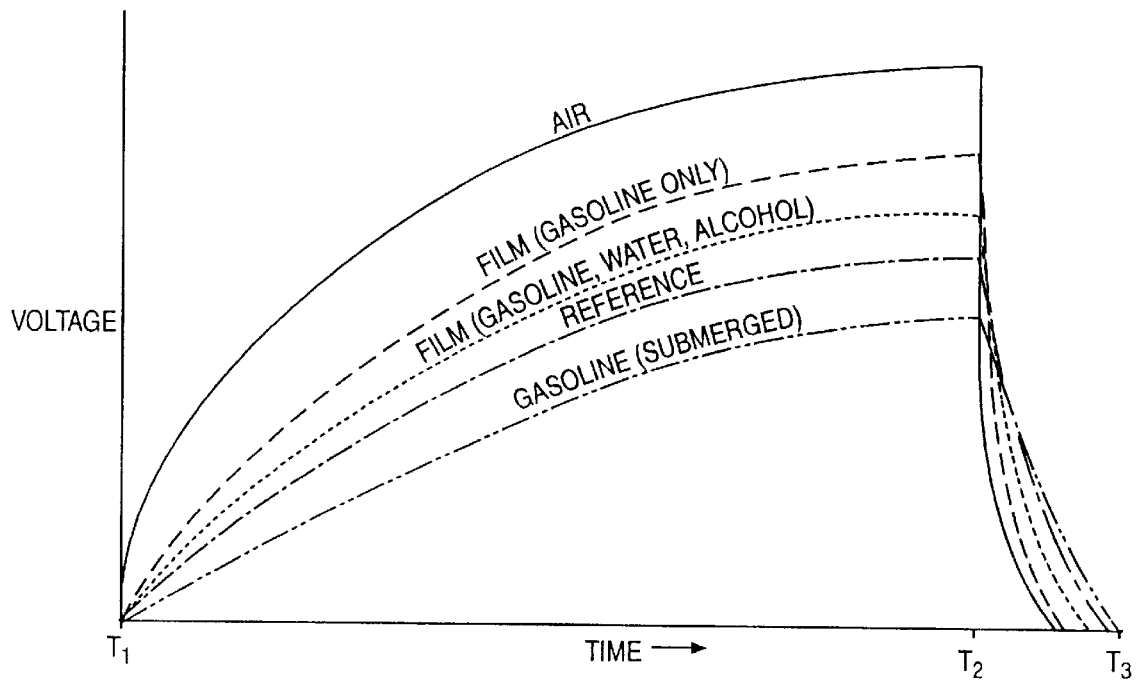
FIG. 10 is a graph of voltages at the input of a comparator of the signal detection circuit of the capacitive liquid level indicator according to the present invention for various fluids contacting a capacitive sensor pair, as well as for a reference.
Figure 10A:
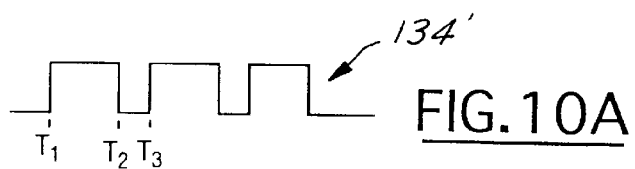
FIG. 10A is a schematic representation of a preferred waveform of an oscillating voltage supplied to the dual capacitive sensor array of the capacitive liquid level indicator according to the present invention.

Examplar graphs of the voltage at the first and second connections 142, 146 are depicted at FIG. 10. The "reference" voltage is that of the second connection 146, and the other indicated voltages are for the first connection 142 wherein the specified fluid medium is in contact with the capacitive sensor pair 112. It will be noted that only if the capacitive sensor pair 112 is submerged in gasoline will the voltage at the second connection be greater than that at the first connection, so that the comparator 144 is switched on. By comparison, for gasoline only films, for gasoline, for water, for alcohol films, and for air, the capacitance of the capacitive sensor pair 112 is such that the voltage at the second connection is less than the voltage of the first connection, so that the comparator 144 is switched off.

It will be noted in FIG. 10 that the charge and discharge time constants of the capacitive sensor pair 112 when in various media dictates the timing of the oscillator pulses, $T_1$, $T_2$, $T_3$, as depicted at FIGS. 10 and 10A.

Figure 8:
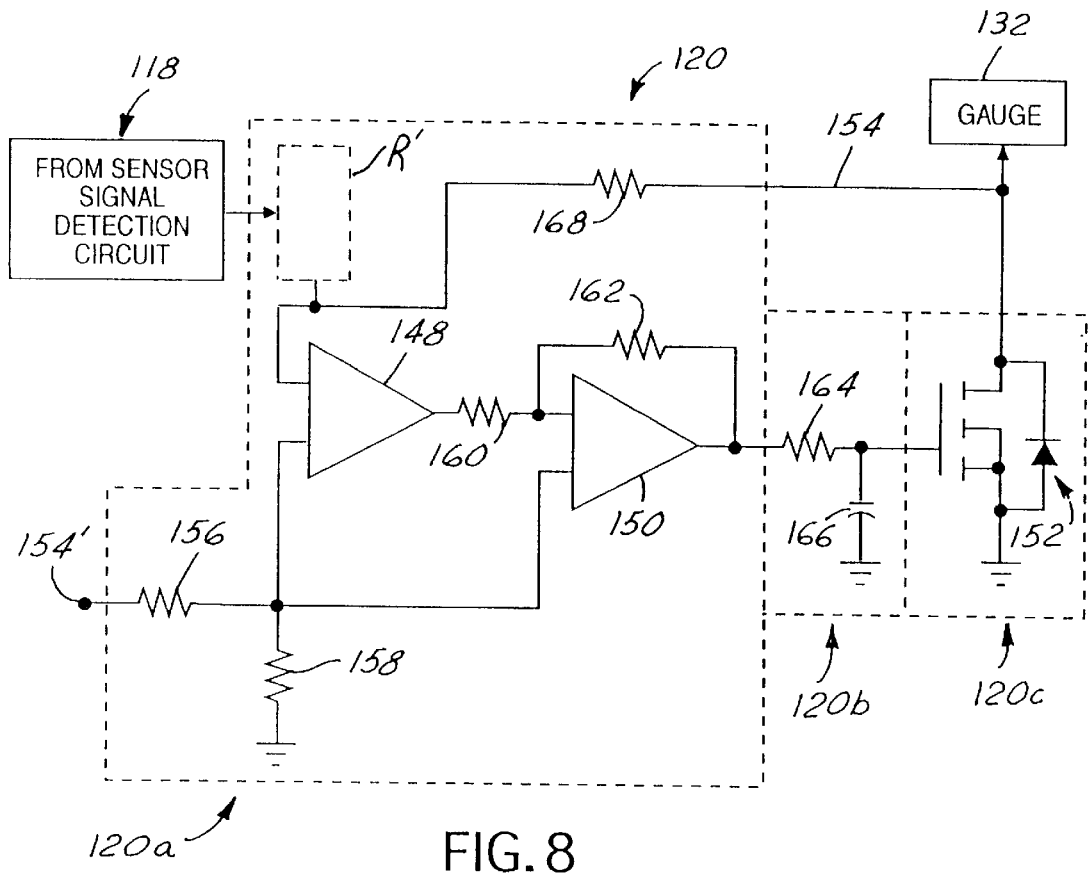
FIG. 8 is a schematic diagram of a preferred conditioning circuit of the capacitive liquid level indicator according to the present invention.

The signal output from the comparators 144 then goes to the conditioning circuit 120. The conditioning circuit 120 takes the digital signal from the comparators 144 and provides driving of a level indicator, such as a gauge 132. For example, the conditioning circuit 120 converts the digital signal of the comparators 144 of the sensor signal detection circuit 118 to a damped analog signal for actuating a conventional analog fuel gauge. In this regard (see FIGS. 6 and 8), a resistive summer R' of the conditioning circuit 120 provides a resistor R, respectively, for the input of each comparator 144. One side of the resistors R is connected to a respective comparator 144, while the other side of the resistors are connected to a summing junction J. The summing junction J is electrically connected to the same junction as the upper input of comparator 148 and the left end of resistor 168 in FIG. 8. These resistors R are required for mutually exclusive outputs from each comparator 144 in FIG. 6 and provide a current from each comparator into or out of the summing junction J which is inversely proportional to their value and proportional to the magnitude of the voltage across each resistor R. The voltage across each resistor R being the difference between the output voltage of each comparator 144 and the voltage at the summing junction J. Hence, the current through resistor 168 in FIG. 8 is equal to the sum of the currents through all resistors R of the resistive summer R'. Thus, the current through the gauge 132 in FIG. 8 and MOSFET 152 in FIG. 8 is responsive to the number of comparators 144 in FIG. 6 that are on (or off).

An example of a preferred conditioning circuit is schematically depicted at FIG. 8. A first block 120a, which includes the resistive summer R', a comparator 148 and an op amp 150 (both for example an LMC660), provides a selected output slope and offset, a second block 120b provides damping, and a third block 120c, which includes a MOSFET 152 (for example a Motorola 2N7002LT1), provides a current sink for driving the gauge 132 responsive to the voltage output from the sensor signal detection circuit 118. A feed back 154 is provided between the gauge 132 and the conditioning circuit 120.

For instructive purposes, and not by way of imitation, examples of component values are: the voltage source 154 has a positive voltage of 8 volts; resistors R each have a resistance of 100 kilo-Ohms, resistor 156 has a resistance of 273 kilo-Ohms; resistor 158 has a resistance of 100 kilo-Ohms; resistor 160 has a resistance of 1 kilo-Ohm; resistor 162 has a resistance of 2 kilo-Ohms; resistor 156 has a resistance of 100 kilo-Ohms; capacitor 166 has a capacitance of 22 micro-Farads; and resistor 168 has a resistance of 1920 Ohms.

In operation, the capacitive liquid level indicator is placed into a tank so that the capacitive sensor pairs are arranged from bottom to top thereof. While a vertical orientation is preferred (ie. normal to horizontal), the substrate can be placed at a preselected acute angle with respect to horizontal The tank is then fired, wherein some or all the sensor capacitors are submerged in the liquid and a corresponding number of sensor signal detection circuits are also submerged.

The electronics of the capacitive lipid level indicator is activated, wherein the oscillator circuit causes the sensor and reference capacitors to periodically charge and discharge at a rate preferably faster than the gain band width of the comparators. Those capacitive sensors inside the liquid have a sufficiently higher capacitance which affect the RC bridge such that the comparator connected thereto is in the on state. However, as the liquid level falls, those capacitive sensor pairs which emerge from the liquid have a reduced capacitance which affects the RC bridge such that the comparator connected thereto switches to the off state.

The very wide dynamic range of the capacitive liquid level indicator 100 on account of the dual capacitive sensor array and very small to non-existent trans-substrate parasitic electric fields, allows for the sensor detection circuit to distinguish immersion of the capacitive sensor pairs in a liquid from being coated by a film of the liquid. Therefore, false liquid level indications are essentially eliminated, and, since no reference capacitive sensor is used, biasing error cannot result in the tank being falsely indicated as full when in fact it is empty.

The conditioning circuit provides a signal to an indicator 120, via the aforementioned resistive summer R' having resistors (see FIGS. 4A and 5A) for respectively each comparator 144 and a summing junction J (see FIG. 6), responsive to the number of capacitive sensors which are submerged in the liquid.

To those of skill in the art, it will be appreciated that electronics added to the circuit of the capacitive liquid level indicator 100 can be designed to sense alcohol concentration in gasoline or water concentration in gasoline based upon the dielectric property responsive to the concentration, which dielectric affects the capacitance of the capacitive sensor pairs and provides a detectable and distinguishable voltage thereof at the comparator input. Or, the electronics can be adjusted to distinguish various liquids layered over one another, such as for example oil over water, or gasoline over water.

Further to those having skill in the art, it will be appreciated that motion detection can be indicated using the capacitive liquid level indicator 100, wherein sloshing of the liquid causes periodically and varying number of the capacitive sensor pairs to register submergence.

Further still, additional electronics may be added or incorporated with respect to the capacitive liquid level indicator 100. For example, pressure sensing circuitry may be added to the capacitive liquid level indicator 100 to provide indication of tank internal pressure. Further for example, a fuel pump control circuit may be added to the capacitive lipid level indicator 100 to provide fuel pump speed control at the fuel tank. In this regard advantages are provided, such as for example shared electronics, wiring, circuit board and/or coating.

It is to be understood that while it is preferred for the sensor capacitors to be configured as interdigitated straight "plates" (fingers), any suitable capacitor configuration may be substituted therefor, such as for example concentric circular "plates".

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A capacitive liquid level indicator comprising:
   a dielectric substrate having a first side and an opposite second side;
   a dual capacitive sensor array comprising a first capacitive sensor array located at said first side of said substrate and a second capacitive sensor array located at said second side of said substrate, said first and second capacitive sensor arrays comprising a plurality of capacitive sensor pairs; and
   electronic means for sensing capacitance of said dual capacitive sensor array in response to fluids contacting said dual capacitive sensor array;
   wherein said electronic means comprises:
      oscillator means for providing an oscillating voltage; and
      sensor signal detection circuit means connected with said oscillator means and each said capacitive sensor pair for providing an electronic signal responsive to the capacitance of each respective capacitive sensor pair;
   wherein said sensor signal detection circuit means comprises a sensor signal detection circuit for each said capacitive sensor pair comprising:
      an RC bridge comprising:
         a first leg comprising a sensor resistor and a respective capacitive sensor pair; and
         second leg comprising a reference resistor and a reference capacitor;
      a first connection to said first leg located between said sensor resistor and said respective capacitive sensor pair;
      a second connection to said second leg located between said reference resistor and said reference capacitor; and
      comparator means connected with said first and second connections for switching between an on state and an off state responsive to voltage differences between said first and second connections.

2. The capacitive liquid level indicator of claim 1, wherein said first capacitive sensor array comprises a plurality of mutually spaced first capacitive sensors; and wherein said second capacitive sensor array comprises a plurality of mutually spaced second capacitive sensors, wherein said plurality of first capacitive sensors is superposed in relation to said plurality of second capacitive sensors.

3. The capacitive liquid level indicator of claim 2, wherein each respectively superposed first and second capacitive sensors are mutually connected in parallel to form each said capacitive sensor pair.

4. The capacitive liquid level indicator of claim 3, wherein the first capacitive sensor of each capacitive sensor pair has a polarization like that of the superposed second capacitive sensor thereof.

5. The capacitive liquid level indicator of claim 4, wherein each respective sensor signal detection circuit is located substantially immediately adjacent its respective capacitive sensor pair.

6. The capacitive liquid level indicator of claim 5, wherein said electronic means further comprises signal conditioning means connected with said sensor signal detection circuit means for driving a preselected liquid level indicator.

7. The capacitive liquid level indicator of claim 6, wherein said electronic means is coated with a low dielectric conformal coating.

8. A capacitive liquid level indicator comprising:
 a dielectric substrate;
 at least one capacitive sensor array connected with said substrate, said at least one capacitive sensor array comprising a plurality of capacitive sensors; and
 electronic means for sensing capacitance of said plurality of capacitive sensors in response to fluids contacting said at least one capacitive sensor array, said electronic means comprising:
  oscillator means for providing an oscillating voltage; and
  sensor signal detection circuit means connected with said oscillator means and each said capacitive sensor for providing an electronic signal responsive to the capacitance of each respective capacitive sensor;
 wherein said sensor signal detection circuit means comprises a sensor signal detection circuit for each said capacitive sensor comprising:
  an RC bridge comprising:
   a first leg comprising a sensor resistor and a respective capacitive sensor; and
   a second leg comprising a reference resistor and a reference capacitor;
  a first connection to said first leg located between said sensor resistor and said respective capacitive sensor;
  a second connection to said second leg located between said reference resistor and said reference capacitor; and
  comparator means connected with said first and second connections for switching between an on state and an off state responsive to voltage differences between said first and second connections.

9. The capacitive hissed level indicator of claim 8, wherein each respective sensor signal detection circuit is located substantially Immediately adjacent its respective capacitive sensor.

10. The capacitive liquid level indicator of claim 9, wherein said electronic means further comprises signal conditioning means connected with said sensor signal detection circuit means for driving a preselected liquid level indicator.

11. The capacitive liquid level indicator of claim 10, wherein said electronic means is coated with a low dielectric conformal coating.

12. A capacitive liquid level indicator comprising:
 a dielectric substrate having a first side and an opposite second side;
 a dual capacitive sensor array comprising a first capacitive sensor array located at said first side of said substrate, wherein said first capacitive sensor array is arranged in a predetermined spaced relation such that said first capacitive sensor array has a predetermined lend and a second capacitive sensor array located at said second side of said substrate wherein said second capacitive sensor array is arranged in a predetermined spaced relation such that said second capacitive sensor array has substantially said predetermined length, said first and second capacitive sensor arrays comprising a plurality of capacitive sensor pairs; and
 electronic means for sensing capacitance of said dual capacitive sensor array in response to fluids contacting said dual capacitive sensor array, said electronic means comprising:
  oscillator means for providing an oscillating voltage; and
  sensor signal detection circuit means connected with said oscillator means and each said capacitive sensor pair for providing an electronic signal responsive to the capacitance of each respective capacitive sensor pair, wherein said signal detection circuit means comprises a sensor signal detection circuit for each said capacitive sensor pair;
  wherein each respective sensor signal detection circuit is entirely located on said substrate within three-quarters of said predetermined length from its respective capacitive sensor pair such that each respective sensor signal detection circuit is entirely disposed closely adjacent its respective capacitive sensor pair;
 wherein each respectively superposed first and second capacitive sensors are mutually connected in parallel to form a capacitive sensor pair;
 wherein the first capacitive sensor of each capacitive sensor pair has a polarization like that of the superposed second capacitive sensor thereof;
 wherein said first capacitive sensor array comprises a plurality of mutually spaced first capacitive sensors; and wherein said second capacitive sensor array comprises a plurality of mutually spaced second capacitive sensors, wherein said plurality of first capacitive sensors is superposed in relation to said plurality of second capacitive sensors.

13. The capacitive liquid level indicator of claim 12, wherein each respectively superposed first and second capacitive sensors are mutually connected in parallel to form a capacitive sensor pair.

14. The capacitive liquid level indicator of claim 13, wherein the first capacitive sensor of each capacitive sensor pair has a polarization like that of the superposed second capacitive sensor thereof.

* * * * *